United States Patent [19]

Derouane et al.

[11] Patent Number: 4,898,722

[45] Date of Patent: * Feb. 6, 1990

[54] SYNTHESIS OF CRYSTALLINE SAPO-37

[75] Inventors: Eric G. Derouane, Namur, Belgium; Roland von Ballmoos, Pennington, N.J.

[73] Assignee: Mobil Oil Corp., New York, N.Y.

[*] Notice: The portion of the term of this patent subsequent to Jun. 16, 2004 has been disclaimed.

[21] Appl. No.: 683,785

[22] Filed: Dec. 19, 1984

[51] Int. Cl.$^4$ .............................................. C01B 33/28
[52] U.S. Cl. .................................... 423/328; 423/305
[58] Field of Search ............... 423/305, 306, 326, 328; 502/150, 162, 164, 208, 214

[56] References Cited

U.S. PATENT DOCUMENTS

| | | | |
|---|---|---|---|
| 2,428,741 | 10/1947 | Plank | 502/203 |
| 2,876,266 | 4/1959 | Wegner et al. | 260/641 |
| 3,560,370 | 2/1971 | Billon et al. | 208/111 |
| 3,697,550 | 10/1972 | Bayne et al. | 260/346.8 |
| 3,801,704 | 4/1974 | Kobayashi et al. | 423/309 |
| 3,904,550 | 9/1975 | Pine | 252/437 |
| 4,014,945 | 3/1977 | Zimmerschied | 260/635 |
| 4,071,471 | 1/1978 | Banks et al. | 252/437 |
| 4,158,621 | 6/1979 | Swift et al. | 208/114 |
| 4,179,358 | 12/1979 | Swift et al. | 208/114 |
| 4,205,053 | 5/1980 | Rollmann et al. | 423/328 |
| 4,210,560 | 7/1980 | Kehl | 252/437 |
| 4,222,896 | 9/1980 | Swift et al. | 252/437 |
| 4,228,036 | 10/1980 | Swift et al. | 252/437 |
| 4,310,440 | 1/1982 | Wilson et al. | 252/435 |
| 4,361,705 | 11/1982 | Marcelin et al. | 568/462 |
| 4,363,748 | 12/1982 | Crum et al. | 252/437 |
| 4,365,095 | 12/1982 | Marcelin et al. | 568/462 |
| 4,385,994 | 5/1983 | Wilson et al. | 210/689 |
| 4,440,871 | 4/1984 | Lok et al. | 502/214 |
| 4,495,166 | 1/1985 | Calvert et al. | 423/329 |
| 4,526,879 | 7/1985 | Dwyer et al. | 423/329 |

FOREIGN PATENT DOCUMENTS

| | | | |
|---|---|---|---|
| 0286985 | 11/1970 | U.S.S.R. | 502/233 |
| 2068253 | 1/1981 | United Kingdom | |

*Primary Examiner*—John Doll
*Assistant Examiner*—Bruce Breneman
*Attorney, Agent, or Firm*—Alexander J. McKillop; Charles J. Speciale; Dennis P. Santini

[57] ABSTRACT

An improved method for synthesis of improved silicoaluminophosphate SAPO-37 is provided. The method comprises (1) preparing a two-phase reaction mixture containing particular components and comprising both a liquid organic phase and a liquid aqueous phase; (2) heating the reaction mixture at a rate of from 5° C. to 200° C. per hour to a temperature of from 80° C. to 200° C.; (3) agitating the reaction mixture in a manner sufficient to intimately admix said liquid organic and aqueous phases with each other; (4) once nucleation of the silicoaluminophosphate occurs, heating the agitated reaction mixture at rate of from 5° C. to 200° C. per hour to a temperature of from 100° C. to 300° C.; (5) maintaining the agitated reaction mixture at a temperature of from 100° C. to 300° C. and a pH of from 2 to 9 until crystals of the desired silicoaluminophosphate are formed; and (6) recovering silicoaluminophosphate material from the reaction mixture.

7 Claims, No Drawings

SYNTHESIS OF CRYSTALLINE SAPO-37

BACKGROUND OF THE INVENTION

1. Field of The Invention

This invention relates to a new and improved form of crystalline silicoaluminophosphate designated "SAPO-37", to a new and useful improvement in synthesizing said crystalline material and to use of the crystalline material prepared in accordance herewith as a catalyst for organic compound, e.g. hydrocarbon compound, conversion.

More particularly, this invention relates to an improved method for preparing crystalline SAPO-37 whereby synthesis is facilitated and reproducible and the product exhibits high purity and catalytic utility.

2. Discussion of Prior Art

Conventional silicoaluminophosphate SAPO-37 and its preparation are taught by U.S. Pat. No. 4,440,871, the entire disclosure of which is incorporated herein by reference. SAPO-37 has a faujasite-type structure.

SUMMARY OF THE INVENTION

An improved reproducible method for preparing an improved crystalline material identified as SAPO-37 exhibiting high purity, catalytic activity and other valuable properties is provided. The method comprises (1) preparing a two-phase reaction mixture containing particular components and comprising both a liquid organic phase and a liquid aqueous phase; (2) heating the reaction mixture under a carefully controlled program at a rate of from 5° C. to 200° C. per hour to a temperature of from 80° C. to 200° C.; (3) agitating the reaction mixture in a manner sufficient to intimately admix said liquid organic and aqueous phases with each other; (4) once nucleation of the silicoaluminophosphate occurs, heating the agitated reaction mixture at rate of from 5° C. to 200° C. per hour to a temperature of from about 100° C. to 300° C.; (5) maintaining the agitated reaction mixture at a temperature of from 100° C. to 300° C. and a pH of from 2 to 9 until crystals of the desired silicoaluminophosphate are formed; and (6) recovering the silicoaluminophosphate material from the reaction mixture.

The essential components of the two-phase reaction mixture include water, sources of aluminum oxide, silicon oxide, phosphorus oxide, an organic directing agent A, inorganic cations M and anions N; and a substantially water-immiscible organic solvent. Such components are present in the following relationships:

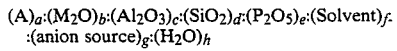

wherein a, b, c, d, e, f, g and h are numbers satisfying the following relationships:

$a/(c+d+e)$ is less than 4,
$b/(c+d+e)$ is less than 2
$d/(c+e)$ is less than 2,
$f/(c+d+e)$ is from 0.1 to 15,
$g/(c+d+e)$ is less than 2, and
$h/(c+d+e)$ is from 3 to 150.

Upon initial preparation of the reaction mixture, the source of one of the aluminum, silicon or phosphorus oxides is dispersed or dissolved in the organic phase.

EMBODIMENTS

The improved method of this invention provides an increase in yield of about 200% over the SAPO-37 preparation method taught in U.S. Pat. No. 4,440,871, a factor of nearly 3. It offers a reproducible method for making SAPO-37 with higher cation exchange capacity for identical silicon content and a higher number of total cation exchange sites.

The crystalline material produced by this method is characterized by a composition in which the number of atoms of aluminum and phosphorus is greater than the number of atoms of silicon, i.e. Al+P>Si. As synthesized, the characteristic composition for such material, in the anhydrous state, is as follows:

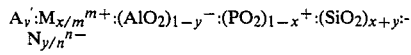

wherein v is moles of A' which is the occluded organic material resulting from organic directing agent A and/or organic solvent used in synthesis of and filling microporous voids of the silicoaluminophosphate, which material may be removed upon calcination; M is an inorganic cation of valence m; N is an anion of valence n; and x and y are numbers of from greater than −1 to less than +1 which satisfy the relationships:

(1) if x is 0, then y is not 0,
(2) if y is 0, then x is not 0,
(3) the sum of x+y is less than 1, but greater than 0, e.g., from 0.02 to 0.99.

In the above composition, when x is greater than y, the silicoaluminophosphate is a cation exchanger with potential use as an acidic catalyst. When x is less than y, the silicoaluminophosphate is an anion exchanger with potential use as a basic catalyst. In any event, the silicoaluminophosphate will exhibit an ion exchange capacity of at least about 0.05 meq/g (higher than that of conventional SAPO-37 with identical framework composition prepared as taught in U.S. Pat. No. 4,440,871).

The composition of the silicoaluminophosphate in the anhydrous state with organic material removed, and with M, m, N, n, x and y as above-defined, is as follows:

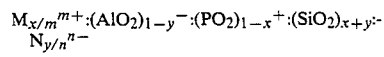

The synthetic crystalline material prepared by the present method is an effective cationic ion-exchanger and acid catalyst when the Al/P ratio is greater than unity. Such catalyst has an acid strength spectrum differing from that of zeolites, which can be beneficial in some catalytic processes. For Al/P ratios lower than unity, anionic exchange properties prevail and render the material active for base-catalyzed reactions. It also offers a new class of catalyst support and is particularly interesting in this respect because of its high ion-exchange capacity (higher than conventional SAPO-37 with identical framework composition) which should enable the retention of rather high metal loadings. It will show in the latter case the same catalytic flexibility as other supported metal catalysts.

If synthesized with an aluminum/phosphorus atomic ratio of greater than one, the crystalline silicoaluminophosphate will exhibit an aluminum/silicon atomic ratio of greater than 1.5, and usually in the range of from 1.6 to 600. When the aluminum/phosphorus ratio is of less than one, it exhibits a phosphorus/silicon atomic ratio of greater than unity, usually within the range of from 1.2 to 600.

It is well recognized that aluminum phosphates exhibit a phosphorus/aluminum atomic ratio of unity, and no silicon.

Also, the phosphorus-substituted zeolite compositions, sometimes referred to as "aluminosilicophosphate" zeolites, have a silicon/aluminum atomic ratio of usually greater than unity, generally from 0.66 to 8.0, and a phosphorus/aluminum atomic ratio of less than unity, usually from greater than 0 to 1.

The present use of a two-phase synthesis reaction mixture system, exclusive of the solids, enables one to maintain in solution in the organic phase one or more of the reactants which are normally insoluble or unstable in the aqueous phase under the present synthesis conditions. Such a procedure enables the preparation of improved SAPO-37 product when compared to conventional synthesis. The two-phase synthesis method of the present invention also enhances the ability to control the crystallization reaction. In addition to its templating role, the organic directing agent can also act as a surfactant. It can help the codispersion of the organic and aqueous phases containing the reagents.

In the synthesis method of the present invention, the reaction mixture will contain, as noted hereinbefore, sources of silicon oxide, phosphorus oxide and aluminum oxide, directing agent and an organic solvent in the relationship hereinbefore set forth.

The organic directing agent required for this invention is a mixture of two different organic materials. They are a tetrapropylammonium and tetramethylammonium. The ratio of tetrapropylammonium/tetramethylammonium in the mixture will be from 10/1 to 80/1. The compounds providing these materials may be halides, e.g., chloride or iodide, hydroxide, acetate, sulfate, carboxylate, etc. or combinations thereof. Tetrapropylammonium alone directs synthesis of ALPO-5 type structure. Tetramethylammonium alone directs synthesis of sodalite type structure. Together as indicated SAPO-37 is the directed crystal product structure.

The useful sources of aluminum oxide include, as non-limiting examples, any known form of aluminum oxide or hydroxide, organic or inorganic salt or compound.

The useful sources of phosphorus oxide include, as non-limiting examples, any known form of phosphorus acids or phosphorus oxides, phosphates and phosphites, and organic derivatives of phosphorus.

The useful sources of silicon oxide include, as non-limiting examples, any known form of silicic acid or silicon dioxide, alkoxy- or other compounds of silicon.

The organic solvent used to form the two-phase reaction mixture can be any organic liquid which is substantially immiscible with water under the crystallization conditions of the present method. Non-limiting examples of such a solvent include the $C_5$–$C_{10}$ alcohols, phenols, and naphthols; and other substantially water-immiscible organic solvents. Polar organic compounds are preferred for the organic phase solvent.

The inorganic cations and anions essentially present in the reaction mixture are generally not provided by separately added components. Rather, these cations and anions will frequently come from compounds added to the reaction mixture to provide the other essential components such as the silicon, alumina and/or phosphorus sources or such as the directing agent or any pH adjustment agents which may be used.

One of the sources of silicon oxide, aluminium oxide or phosphorus oxide must initially be present in the organic phase of the reaction mixture. The aqueous phase will thus comprise the directing agent, cations and anions, pH adjustment agents and those remaining essential components which are not added to the organic phase.

The reaction mixture having the composition hereinbefore described is heated carefully at a rate of from about 5° C. to about 200° C. per hour up to a temperature of from about 80° C. to about 200° C. and maintained within that temperature range until nucleation of SAPO-37 occurs. Then the reaction mixture is heated at a rate of from about 5° C. to about 200° C. per hour to a final temperature of from about 100° C. to about 300° C. until crystals of desired SAPO-37 form, usually from about 5 hours to about 500 hours. The pH of the reaction mixture during crystallization is carefully maintained at from about 2 to about 9. This may be accomplished by adjusting the concentration of the added base(s).

During the heat-up and crystallization steps, the reaction mixture will generally be agitated in a manner sufficient to intimately admix the substantially immiscible organic and aqueous phases. Techniques for dispersing the organic and aqueous phases in each other are well know in the art. It may even be desirable to form an emulsion of the organic and aqueous phases in order to maximize the interface between these liquid phases.

Following crystallization of the desired material, the reaction mixture containing same is filtered and the recovered crystals are washed, for example with water, and then dried, such as by heating at from about 25° C. to about 150° C. at atmospheric pressure.

In a more specific illustration of the present synthesis method, the aqueous phase contains the phosphorus and aluminum reagents, for example phosphoric acid and alumina. The organic phase with hexanol, for example, as solvent contains the silicon source, e.g. tetra-orthoalkylsilicate. The organic directing agent, i.e. a 37/1 mixture of tetrapropylammonium and tetramethylammonium , also acts as a surfactant to emulsify the aqueous and organic phases and optimize the interface. Silicon is progressively supplied during synthesis to the gel by hydrolysis of its organic compound and transfer of the product through the interface into the aqueous phase.

As silicon, aluminum and phosphorus must be available simultaneously to nucleate and crystallize the improved silicoaluminophosphate, the rates of supply of all three elements have to be comparable. This implies that the neutralization reaction, e.g. between $H_3PO_4$ and $Al_2O_3$, and the hydrolysis of the organic silicon compound have to be concerted. Therefore, it may be important to predigest the alumina - phosphoric acid mixture. Even more critical will be the silicon supply rate which is depending on factors such as the magnitude of the interface, temperature, pH of the aqueous phase, concentration, and nature of the organic solvent and of the silicon reagent.

Because the hydrolysis and transfer rates of silicon are controlled by the magnitude of the interface, as discussed earlier, silicon incorporation is expected to be favored as mixing increases.

As mentioned hereinbefore, pH is a critical synthesis variable. As the formation of the silicoaluminophosphate proceeds, pH values of around or above neutral (i.e. about 6 or more, up to a maximum of 9) should be maintained. As the base stability of silicoaluminophopshate is expected to be intermediate between those of aluminum phosphates and zeolites, pH values of about 8 or slightly above 8 are preferred. Because of the major role played by the hydrolysis of the silicon reagent and the necessity to control it in the present method, there is a need to have a nearly constant pH during crystallization (in particular, to avoid rapid acid hydrolysis of the silicon source). This can be achieved by predigestion of alumina in phosphoric acid before addition of the other reagents, which raises the initial pH to 5-7.

To achieve and maintain higher pH values (pH = 8 or above), even after partial decomposition of the organic hydroxide, inorganic bases may be added.

The SAPO-37 prepared hereby having silicon, phosphorus and aluminum as crystal lattice framework components is a molecular sieve. It possesses a definite distinguishing crystalline structure which exhibits a characteristic X-ray powder diffraction pattern as detailed in Table 1.

TABLE 1

| Interplanar d-Spacing (A) | Relative Intensity |
|---|---|
| 14.25 ± 0.2 | vs |
| 8.65 ± 0.1 | m |
| 7.45 ± 0.1 | w |
| 5.65 ± 0.05 | m-s |
| 4.75 ± 0.05 | m-s |
| 4.35 ± 0.05 | m |
| 4.20 ± 0.05 | w |
| 3.90 ± 0.03 | w |
| 3.77 ± 0.03 | s |
| 3.46 ± 0.03 | w |
| 3.30 ± 0.02 | m |
| 3.02 ± 0.02 | w |
| 2.91 ± 0.02 | w |
| 2.85 ± 0.02 | m |
| 2.76 ± 0.02 | w |
| 2.63 ± 0.02 | w |

These X-ray diffraction data were collected with a Rigaku X-ray system, using copper K-alpha radiation. The positions of the peaks, expressed in degrees 2 theta, where theta is the Bragg angle, were determined by step-scanning at 0.02 degrees of 2 theta intervals and a counting time of 1 second for each step. The interplanar spaces, d, measured in Angstrom units (A), and the relative intensities of the lines, $I/I_o$, where $I_o$ is one-hundredth of the intensity of the strongest line, including substraction of the background, were derived with the use of a profile fitting routine. The relative intensities are given in terms of the symbols vs=very strong (75-100%), s=strong (50-74%), m=medium (25-49%) and w=weak (0-24%). It should be understood that this X-ray diffraction pattern is characteristic of all the species of SAPO-37 compositions synthesized by the present invention. Ion exchange of cations with other ions results in a silicoaluminophosphate which reveals substantially the same X-ray diffraction pattern with some minor shifts in interplanar spacing and variations in relative intensity. Other variations can occur, depending on the silicon/aluminum and phosphorus/aluminum ratios of the particular sample, as well as its degree of thermal treatment.

The improved SAPO-37 synthesized hereby can be used as catalyst in intimate combination with a metal component such as silver, tungsten, vanadium, molybdenum, rhenium, chromium, manganese, or a Group VIII metal such as platinum or palladium where, for example, a hydrogenation-dehydrogenation or oxidation function is to be performed. Such a component can be ion-exchanged into the composition, impregnated therein or intimately physically admixed therewith. Such component can be impregnated into or onto it such as for example, by, in the case of platinum, treating the crystal with a solution containing a platinum metal-containing ion. Thus, suitable platinum compounds include chloroplatinic acid, platinous chloride and various compounds containing the platinum amine complex.

The original ions, i.e. cations or anions, of the as synthesized SAPO-37 can be replaced in accordance with techniques well known in the art, at least in part, by ion exchange with other cations or anions. Preferred replacing cations include metal ions, hydrogen ions, hydrogen precursor, e.g. ammonium, ions and mixtures thereof. Particularly preferred cations include hydrogen, rare earth metals and metals of Groups IIA, IIIA, IVA, IB, IIB, IIIB, IVB, VIB and VIII of the Periodic Table of the Elements.

Typical ion exchange technique would be to contact the synthetic crystalline SAPO-37 with a salt of the desired replacing ion or ions. Examples of such salts of cations include the halides, e.g. chlorides, nitrates and sulfates.

The improved SAPO-37 prepared in accordance herewith can be beneficially converted to another form by thermal treatment. This thermal treatment is generally performed by heating one of these forms at a temperature of at least 300° C. for at least 1 minute and generally not longer than 20 hours. While subatmospheric pressure can be employed for the thermal treatment, atmospheric pressure is desired for reasons of convenience. The thermal treatment can be performed at a temperature up to about 1000° C. The thermally treated product is particularly useful in the catalysis of certain hydrocarbon conversion reactions.

Further, the present SAPO-37, when employed either as an adsorbent, ion-exchanger or as a catalyst in an organic compound conversion process should be dehydrated, at least partially. This can be done by heating to a temperature in the range of 200° C. to 600° C. in air or an inert atmosphere, such as nitrogen, etc. and at atmospheric, subatmospheric or superatmospheric pressures for between 30 minutes and 48 hours. Dehydration can also be performed at room temperature merely by placing the crystalline material in a vacuum, but a longer time is required to obtain a sufficient amount of dehydration. Therefore, depending upon the degree of dehydration or thermal treatment desired for the new SAPO-37, it may be subjected to heating at a temperature of from about 200° C. to about 1000° C. for a time of from about 1 minute to about 48 hours.

The crystals of the improved SAPO-37 prepared by the instant invention can be shaped into a wide variety of particle sizes. Generally speaking, the particles can be in the form of a powder, a granule, or a molded product, such as an extrudate having a particle size sufficient to pass through a 2 mesh (Tyler) screen and be retained on a 400 mesh (Tyler) screen. In cases where the composition is molded, such as by extrusion, the crystals can be extruded before drying or partially dried and then extruded.

In the case of many catalysts, it is desired to incorporate the improved SAPO-37 with another material resistant to the temperatures and other condition employed in organic conversion processes. Such materials include active and inactive material and synthetic or naturally occurring zeolites as well as inorganic materials such as clays, silica and/or metal oxides. The later may be either naturally occurring or in the form of gelatinous precipitates or gels including mixtures of silica and metal oxides. Use of a material in conjunction with the new SAPO-37, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin families which include the subbentonites, and the kaolins commonly known as Dixie, McNamee, Georgia and Florida clays or others in which the main mineral contituent is halloysite, kaolinite, dickite, nacrite, or anauxite. Such clays can be used in the raw sate as originally mined or initially subjected to calcination, acid treatment or chemical modification. Binders useful for compositing with the present crystal also include inorganic oxides, notably alumina or silica.

In addition to the foregoing materials, the improved SAPO-37 crystal can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline SAPO-37 material and inorganic oxide gel matrix vary widely, with the crystal content ranging from about 1 to about 90 percent by weight and more usually, particularly when the composite is prepared in the form of beads, in the range of about 2 to about 80 weight percent of the composite.

The crystalline material of the present invention is readily convertible to catalytically active material for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 $hr^{-1}$ to about 20 $hr^{-1}$; hydrocracking hydrocarbons when the catalyst is associated with an appropriate hydrogenation metal, e.g., noble metal, cobalt, molybdenum, etc. with reaction conditions including a temperature of from about 300° C. to about 450° C., a hydrogen pressure of from about 65 atmospheres to about 200 atmospheres and a weight hourly space velocity of from about 0.5 $hr^{-1}$ to about 5 $hr^{-1}$; and isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 (e.g. 0.1) to about 100.

In general, therefore, catalytic conversion conditions over a catalyst comprising the improved SAPO-37 in active form include a temperature of from about 230° C. to about 700° C., a pressure of from about 0.1 atmosphere (bar) to about 200 atmospheres (bar), a weight hourly space velocity of from about 0.1 $hr^{-1}$ to about 200 $hr-1$ and a hydrogen/organic, e.g. hydrocarbon, compound of from about 0 to about 100.

The crystalline material of the present invention is also useful for sorptive separation of para- and meta-xylene isomers when the crystal is associated with large cations, such as, for example cesium or alkaline earths, e.g., barium or calcium.

In order to more fully illustrate the nature of the invention and the manner of practicing same, the following examples are presented.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 $sec^{-1}$). In the case of zeolite HZSM-5, only 174 ppm of tetrahedrally coordinated $Al_2O_3$ are required to provide an Alpha Value of 1. The Alpha Test is described in U.S. Pat. No. 3,3543,078 and in *The Journal of Catalysis,* Vol. IV, pp. 522–529 (August 1965), each incorporated herein by reference as to that description.

When ion-exchange capacity is examined, it is determined by titrating with a solution of sulfamic acid the gaseous ammonia evolved during the temperature programmed decomposition of the ammonium-form of the crystalline material. The method is described in *Thermochimica Acta,* Vol. III, pp. 113–124, 1971 by G.T. Kerr and A.W. Chester, herein incorporated by reference as to that description.

EXAMPLE 1

In this example, SAPO-37 was prepared as in Example 43 of U.S. Pat. No. 4,440,871.

A reaction mixture was prepared by stirring 30.5 g water, 27.7 g $H_3PO_4$ (85%), and 16.6 g $Al_2O_3$ (Catapal from Conoco) until homogeneous. To this mixture was added a dispersion of 3.1 g silica (HiSil) in 116 g TPAOH 40% (tetrapropylammonium hydroxide) and 1.1 g $TMAOHx5H_2O$ (solid tetramethylammonium hydroxide). This reaction mixture contained from 1.3 to 1.5 grams of available silicon. The reaction mixture was stirred until homogeneous and placed into a 300 ml stainless steel autoclave and heated to 200° C. for 24 hours with moderate stirring. The pH of the mixture was 8.5. The solid product was filtered, washed with water and dried. The yield of as-synthesized material was 9.7 g. The product had an X-ray diffraction pattern typical of materials having the faujasite type structure as shown in Table II. The product was submitted for chemical analysis and the results gave the following composition in weight %:

Silicon: 5.07 wt %
Aluminum: 15.13 wt %
Phosphorus: 13.31 wt %

TABLE II

| d-space | 2xtheta | I/I₀ |
| --- | --- | --- |
| 14.336 | 6.160 | 100 |
| 8.771 | 10.077 | 28 |
| 7.479 | 11.824 | 9 |
| 7.159 | 12.354 | 3 |
| 5.687 | 15.569 | 73 |
| 4.769 | 18.595 | 60 |
| 4.379 | 20.264 | 26 |
| 4.186 | 21.207 | 6 |
| 3.915 | 22.691 | 21 |
| 3.777 | 23.537 | 66 |
| 3.467 | 25.675 | 10 |
| 3.308 | 26.928 | 45 |
| 3.222 | 27.665 | 3 |
| 3.024 | 29.510 | 11 |
| 2.917 | 30.622 | 15 |
| 2.858 | 31.268 | 30 |
| 2.768 | 32.320 | 7 |
| 2.639 | 33.941 | 12 |
| 2.595 | 34.535 | 4 |

EXAMPLE 2

The synthesis of Example 1 was repeated and yielded 9.5 g of a solid dry product with an X-ray diffraction pattern identical to the one of the Example 1 product. The composition of the product was:
Silicon: 3.60 wt %
Aluminum: 17.27 wt %
Phosphorus: 12.46 wt %

EXAMPLE 3

Fractions of the products of Examples 1 and 2 were examined under a light microscope (Nikon, total enlargement 400 x). The crystals in either batch were octahedra with fully developed crystal faces or intergrowths of cubic crystals. Their size was 2 to 10 microns.

EXAMPLE 4

A fraction of the solid product of Example 1 was calcined as described in U.S. Pat. No. 4,440,871, Example 43, and exchanged in a solution of 1 M NH₄Cl. The product of this exchange was heated in helium in a TGA furnace to 1000° C. and the evolved $NH_3$ was titrated. The amount of titrant needed was 0.29 meq/g of ash.

EXAMPLE 5

In this example, improved SAPO-37 was prepared by the present invention.

A two-phase reaction mixture was prepared comprising an aqueous and an organic phase. The organic phase was immiscible with the aqueous phase. In order to make this Example comparable to Examples 1 and 2 above, the molar concentrations of the main constituents (Si, Al, P, and the directing agents) were kept constant. Hence, an aqueous phase containing 30.5 g water, 27.7 g H₃PO₄ (85%), and 16.6 g Al₂O₃ (Catapal from Conoco) was prepared and stirred until homogeneous. As directing agent a mixture of 116 g TPAOH (40 wt % in water) and 1.1 g TMAOHx5H₂O (solid crystals) were added to this mixture and dissolved. The mixture was digested for 1 hour at 80° C. An organic phase was prepared by mixing 60 g 1-hexanol and 10.7 g Si(OC₂H₅)₄. The two phase reaction mixture had from 1.4 to 1.5 grams of available silicon. The two phases were added together in a beaker and stirred; then the reaction mixture was transferred into a 300 ml steel autoclave. The mixture was heated at a rate of 50° C. per hour to 130° C. with stirring (800 rpm) for 24 hours and then kept at 200° C. for 24 hours. The pH was maintained at 9.0. The solid product was filtered, washed with water and dried. The yield of as-synthesized material was 23 g. The product had an X-ray diffraction pattern typical of materials having the faujasite type structure as shown in Table III. Occasional small amounts of impurities were found in the product (marked with an asterisk in the Table). The product was submitted for chemical analysis and the results gave the following composition in weight %:
Silicon: 4.38 wt %
Aluminum: 17.95 wt %
Phosphorus: 11.53 wt %

TABLE III

| d-space | 2xtheta | I/I₀ |
| --- | --- | --- |
| 14.345 | 6.156 | 100 |
| 11.981 | 7.372* | 10 |
| 8.767 | 10.081 | 32 |
| 7.479 | 11.824 | 8 |
| 7.149 | 12.371 | 4 |
| 5.981 | 14.799* | 4 |
| 5.683 | 15.580 | 72 |
| 4.846 | 18.291* | 8 |
| 4.766 | 18.602 | 64 |
| 4.520 | 19.625* | 9 |
| 4.376 | 20.279 | 28 |
| 4.239 | 20.941* | 7 |
| 4.186 | 21.208 | 5 |
| 3.987 | 22.282* | 8 |
| 3.913 | 22.704 | 18 |
| 3.775 | 23.550 | 62 |
| 3.463 | 25.704 | 12 |
| 3.307 | 26.940 | 46 |
| 3.225 | 27.630 | 4 |
| 3.021 | 29.541 | 8 |
| 2.915 | 30.641 | 16 |
| 2.856 | 31.289 | 31 |
| 2.767 | 32.330 | 8 |
| 2.637 | 33.974 | 10 |
| 2.596 | 34.517 | 2 |

EXAMPLE 6

The synthesis of Example 5 was repeated and yielded 25 g of a solid dry product with an X-ray diffraction pattern identical to the one of the Example 5 product. The composition of this product was:
Silicon: 3.74 wt %
Aluminum: 17.04 wt %
Phosphorus: 14.00 wt %

EXAMPLE 7

Fractions of the solid products of Examples 5 and 6 were examined by light and scanning electron microscopy. The crystals were small (below 0.5 microns) and agglomerated. The small crystal size can be related to the broadened X-ray diffraction lines obtained from the products.

EXAMPLE 8

A fraction of the solid product of Example 5 was treated by heating it to 450° C. in nitrogen and keeping it at that temperature for 4 hours, then exchanging it in a solution of 1 M NH₄Cl. A fraction of the product of this exchange was heated in helium in a TGA furnace to 1000° C. and the evolved $NH_3$ was titrated. The amount of titrant needed was 1.02 meq/g of ash.

EXAMPLE 9

A fraction of the exchanged product of Example 8 was tested in the Alpha Test. The Alpha Value was found to be 1.0.

EXAMPLE 10

The synthesis of Example 5 was again repeated, except that the temperature was raised to 200° C. directly at 50° C./hour and kept there for 48 hours. The crystalline product had the diffraction pattern of material having the ALPO-5 structure type (U.S. Pat. No. 4,310,440), and being indistinguishable from SAPO-5 (U.S. Pat. No. 4,440,871).

The above examples illustrate the improvement of the present invention. The following tabulation clarifies the comparison. Cation exchange sites as a measure of titrant needed in TGA is indicated.

TABLE IV

| Examples | Synthesis Reaction Mixture Silicon Available, g | Product | Product Silicon Wt. % | Yield of SAPO-37, g | Product Silicon, g | Titrant Needed |
|---|---|---|---|---|---|---|
| 1,4 | 1.3–1.5 | SAPO-37 | 5.07 | 9.7 | 0.49 | 0.29 meq/gram |
| 2 | 1.3–1.5 | SAPO-37 | 3.60 | 9.5 | 0.34 | — |
| 5,8 | 1.4–1.5 | Improved SAPO-37 | 4.38 | 23.0 | 1.01 | 1.02 meq/gram |
| 6 | 1.4–1.5 | Improved SAPO-37 | 3.74 | 25.0 | 0.94 | — |

When the present method is not followed, such as when the temperature increasing step is not followed, SAPO-37 is not obtained, as illustrated in Example 10.

What is claimed is:

1. A method for synthsizing crystalline material comprising silicon, phosphorus and aluminum and exhibiting a characteristic X-ray diffraction pattern as shown in Table I of the specification which comprises:

(1) providing a reaction mixture comprising water, sources of the said oxide, silicon oxide, and phosphorus oxide, one of the said oxide sources being unstable in the water, an organic directing agent A, wherein said organic directing agent A is a mixture of tetrapropylammonium and tetramethylammonium, inorganic cations M and anions N, and a substantially water-immiscible organic solvent for the said oxide source unstable in the water, the components of said reaction mixture having the following relationship:

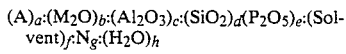
   $(A)_a:(M_2O)_b:(Al_2O_3)_c:(SiO_2)_d:(P_2O_5)_e:(Solvent)_f:N_g:(H_2O)_h$ wherein a, b, c, d, e, f, g, and h are numbers satisfying the following relationship:
   $a/(c+d+e)$ is less than 4,
   $b/(c+d+e)$ is less than 2
   $d/(c+e)$ is less than 2,
   $f/(c+d+e)$ is from 0.1 to 15,
   $g/(c+d+e)$ is less than 2, and
   $h/(c+d+e)$ is from 3 to 150,
   wherein upon initial provision of said reaction mixture the said oxide source unstable in the water is dispersed or dissolved in the water-immiscible organic solvent;

(2) heating said reaction mixture at a rate of from 5° C. to 200° C. per hour to a temperature of from 80° C. to 200° C.;

(3) agitating said reaction mixture in a manner sufficient to intimately admix the water-immiscible organic solvent and the water with each other thereby progressively hydrolyzing the oxide source unstable in water;

(4) when nucleation of said crystalline material occurs, heating said agitated reaction mixture at a rate of from 5° C. to 200° C. per hour to a temperature of from 100° C. to 300° C.;

(5) maintaining said agitated reaction mixture at a temperature of from 100° C. to 300° C. and a pH of from 2 to 9 until crystals of said crystalline material are formed; and (6) recovering from said reaction mixture said crystalline material characterized by a composition, in the anhydrous state, as follows:

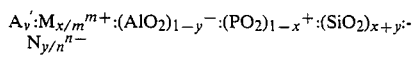
   $A_v':M_{x/m}^{m+}:(AlO_2)_{1-y}^-:(PO_2)_{1-x}^+:(SiO_2)_{x+y}:N_{y/n}^{n-}$ wherein A' represents the total of organic directing agent A plus water-immiscible organic solvent, v is the number of moles of A', m is the valence of cation M, n is the valence of anion N, and x and y are numbers of from greater than −1 to less than +1 which satisfy the relationship:
   (1) if x is 0, then y is not 0,
   (2) if y is 0, then x is not 0,
   (3) the sum of x+y is greater than 0 and less than 1, said crystalline material having an ion exchange capacity of at least about 0.05 meq/g.

2. The method according to claim 1 wherein said organic directing agent A is a mixture of tetrapropylammonium and tetramethylammonium having a ratio of tetrapropylammonium to tetramethylammonium of from 10/1 to 80/1.

3. The method of claim 1 wherein the sources of A are compounds selected from the group consisting of halides, hydroxide, acetate, sulfate, carboxylate and combinations thereof.

4. The method of claim 3 wherein said compounds are tetrapropylammonium hydroxide and tetramethylammonium hydroxide.

5. The method of claim 1 wherein the source of silicon oxide is initially present in the water-immiscible organic solvent, and wherein the pH of the agitated reaction mixture is maintained between 6 and 9.

6. The method of claim 1 which comprises the additional step of heating the recovered crystalline material at a temperature of from 300° C. to 1000° C.

7. A reaction mixture for use in synthesis of a crystalline material comprising silicon, phosphorus and aluminum and exhibiting a characteristic X-ray diffraction pattern as shown in Table I of the specification which comprises a water-immiscible organic solvent and water, said reaction mixture comprising components in the relationship:

$(A)_a:(M_2O)_b:(Al_2O_3)_c:(SiO_2)_d:(P_2O_5)_e:(Solvent)_f:(anion)_g:(H_2O)_h$ wherein a, b, c, d, e, f, g and h are numbers satisfying the following relationships:

$a/(c+d+e)$ is less than 4,
$b/(c+d+e)$ is less than 2
$d/(c+e)$ is less than 2,
$f/(c+d+e)$ is from 0.1 to 15,
$g/(c+d+e)$ is less than 2, and
$h/(c+d+e)$ is from 3 to 150, and wherein A is organic directing agent comprised of a mixture of tetrapropylammonium and tetramethylammonium, M is inorganic cation and Solvent is substantially water-immiscible organic solvent.

* * * * *